Oct. 6, 1970      J. E. ROCHTE      3,532,470

SAMPLE HOLDER WITH CENTRIFUGATION MEANS

Filed Jan. 22, 1968      3 Sheets-Sheet 1

INVENTOR.
JERRY E. ROCHTE
BY
ATTORNEY

Oct. 6, 1970          J. E. ROCHTE          3,532,470
SAMPLE HOLDER WITH CENTRIFUGATION MEANS
Filed Jan. 22, 1968          3 Sheets-Sheet 2
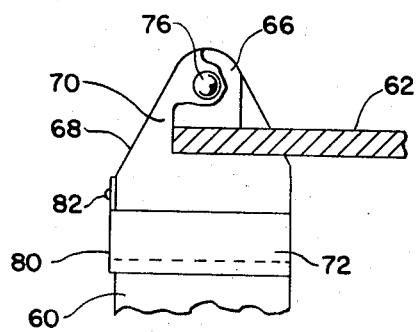
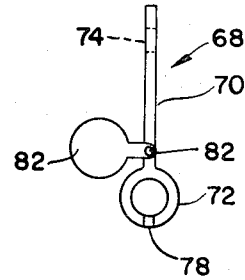
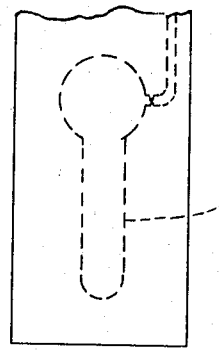
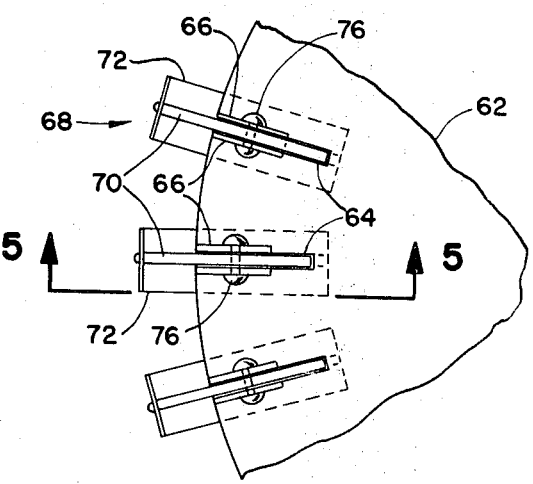
FIG. 5
FIG. 6
FIG. 4
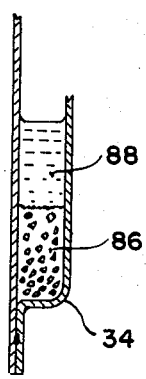
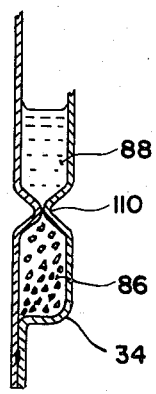
FIG. 8     FIG. 9
INVENTOR.
JERRY E. ROCHTE
BY
ATTORNEY United States Patent Office 3,532,470
Patented Oct. 6, 1970

3,532,470
SAMPLE HOLDER WITH CENTRIFUGATION MEANS
Jerry E. Rochte, Seal Beach, Calif., assignor to Beckman Instruments, Inc., a corporation of California
Filed Jan. 22, 1968, Ser. No. 699,486
Int. Cl. B01l 3/00; B04b 7/00, 11/06
U.S. Cl. 23—253
8 Claims

ABSTRACT OF THE DISCLOSURE

A blood sample holder or capsule which has an elongated container for receiving whole blood and attachment means by which the holder is connected to a centrifuge for spinning the blood down, after which the hematocrit is read along with an identifying number, the separated cells are sealed in isolation, a capillary chamber measures an amount of serum which is later forced into a cup in the holder for automated analytical processing, with the addition of reagents and filtering in situ, and automatic reading of the analytical results with an identifying number.

DISCLOSURE

This application is related to application Ser. No. 699,682 for Sample Holder With Filter Means by Hugh O. Brown et al. filed concurrently herewith.

The present invention relates to a wet chemical sample holder and, more particularly, to a sample holder or capsule which is adapted to receive a sample of whole blood and has attachment means for centrifuging the blood sample in the capsule after which readings are taken and the capsule may be placed in an automated chemical analyzer for further processing. The invention further relates to a sample holder which is provided with means for transferring a measured amount of the blood serum from one cup to another, has prepackaged reagents and filter means, and bears identifying indicia for correlating the analytical results with the patient from whom the sample was taken.

A serious bottleneck in the clinical analysis of blood samples occurs at the initial step where the sample must be centrifuged or spun down prior to subsequent analysis. No feasible means has been developed for automating this step. Also, it is difficult to maintain sample identification since the test form which arrives at the clinical laboratory with the test tube containing the blood sample must be separated from the tube during this step. Temporary identification numbers are usually assigned and applied to both the form and the tube by a suitable marking pencil or the like.

It is, therefore, an object of the present invention to provide a sample holder which is adapted to receive whole blood and be attached to a centrifuge for spinning the blood down, after which a hematocrit reading of the separated blood components, while in the holder, may be taken.

Another object is the provision of a sample holder in which a sample of whole blood may be centrifuged and a measured amount of blood serum transferred from one cup to another.

A further object is to provide a sample holder in which suitable reagents may be added to the sample in a facile manner for easier analysis.

Still another object is the provision of a sample holder in which the sample may be filtered in situ for simplification of the analytical process.

A still further object is to provide a procedure and identifying indicia related to a sample holder for correlation of the analytical results with the patient from whom the sample was taken.

The present invention contemplates and is concerned with a sample holder having an elongated container at one end and centrifuge attachment means at the other end, with a plurality of cups therebetween. The invention further contemplates the holder having a capillary chamber interconnecting two of the cups for transferring a measured amount of sample, prepackaged reagents adjacent some of the cups, with filter means between certain of the cups, and identifying indicia on the holder.

Other objects, advantages and features of the present invention will become better understood by reference to the following detailed description when considered in connection with the accompanying drawing wherein:

FIG. 4 is a fragmentary plan view of a centrifuge having connectors which receive sample holders of the type shown in FIG. 1;

FIG. 5 is a fragmentary sectional view taken generally along the line 5—5 in FIG. 4 and showing the sample holder connected thereto;

FIG. 6 is a side elevation of the connector with the retainer swung to one side to show the keyhole opening in the connector;

FIG. 8 is a detail sectional view illustrating the disposition of the cells and serum after a blood sample has been centrifuged;

FIG. 9 is a view similar to FIG. 8 but showing the cells of the sample sealed off.

Figure 1:
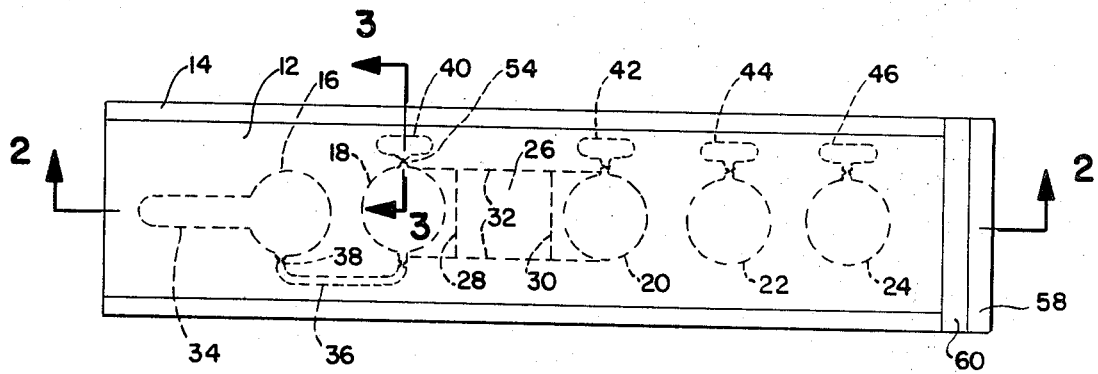
FIG. 1 is a plan view of a clinical sample holder embodying the principles of the present invention.
Figure 2:
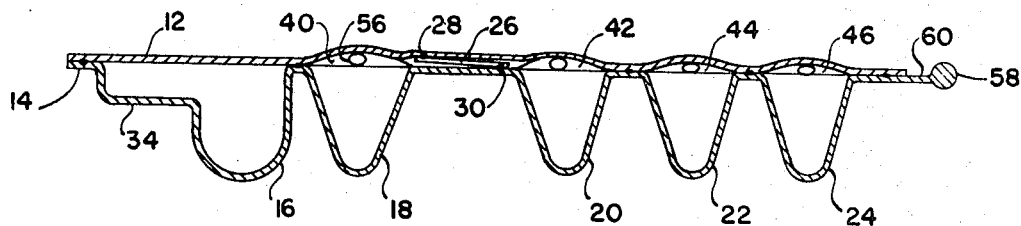
FIG. 2 is a sectional view of the holder taken generally along the line 2—2 of FIG. 1.

Referring now to the drawing, there is shown in FIG. 1 a sample holder in accordance with the present invention having a cover 12 superimposed on a body member 14 (FIG. 2) which is formed with a row of wells or cups 16, 18, 20, 22 and 24 and incorporates filter means 26 disposed between cups 18 and 20 and sealed to the cover and body member, as at 28 and 30, respectively, the side edges thereof being sealed to the body member, as at 32, all of suitable materials. The construction described thus far is essentially the same as that disclosed in the aforementioned application. The sample holder of the present invention, however, is further provided with an elongated cup or container 34 formed in body member 14 and communicating with cup 16 and, in effect, constituting an extension thereof, as shown in FIG. 2. The sample holder also has a conduit or capillary chamber or conduit 36 in communication with cups 16 and 18, the chamber having pinched ends or restrictions 38, and a plurality of prepackaged reagent containers 40, 42, 44 and 46 adjacent cups 18, 20, 22 and 24, respectively.

Figure 3:
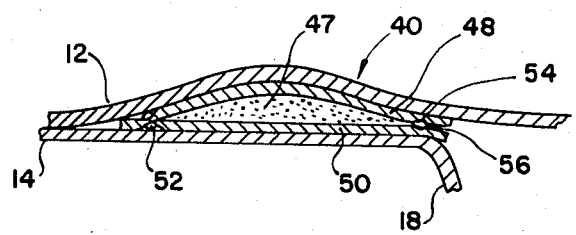
FIG. 3 is a detail sectional view, on a larger scale, taken generally along the line 3—3 of FIG. 1.

FIG. 3 illustrates and is representative of the relation of each reagent container to its associated cup and only one of the containers will be described in detail, container 40 being selected for this purpose. It will be noted that container 40 is of double walled construction, containing a measured amount of reagent 47, and may be made with an upper cupped wall 48 and a lower flat wall 50 joined to each other at the edges thereof, as at 52, and having a pinched neck or weakened point 54 to provide a mouth 56 communicating with cup 18. The application of pressure to walls 48 and 50 forces the pinched neck 54 open and the reagent 47 is discharged through mouth 56.

Container or extension 34 is adapted to hold a sample of whole blood which is to be centrifuged or spun down and for this purpose body member 14, at the other end thereof, is provided with a rod-like enlargement or rod 58 and a short connecting web 60 between the rod and cup 24.

The sample holder of the present invention is thus adapted to be supported on a centrifuge comprising a turntable 62, fragmentarily shown in FIG. 4. Turntable 62 has formed therein a plurality of radially disposed slots 64, with a pair of upstanding flanges 66 adjacent each slot. Each pair of flanges 66 is adapted to pivotally support a connector 68 which includes a connecting web 70 and a sleeve or tubular member 72 adapted to receive the enlargement or rod 58 of the sample holder. Web 70 is provided with a perforation 74 which receives a pivot pin 76, the latter also passing through suitable perforations in flanges 66. Sleeve or tubular member 72 is slotted, as at 78, to provide a keyhole opening accommodating rod 58 and web 60, retained in sleeve 72 by a closing plate or retainer 80 pivoted to web 70, as at 82, the retainer being adapted to be swung out of closing position for attachment and detachment of the sample holder.

Figure 7:
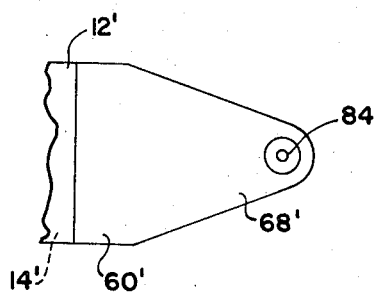
FIG. 7 is a fragmentary plan view of a modified form of connector.

In FIG. 7 there is illustrated another type of connector 68' which dispenses with the connector 68 by forming the sample holder or capsule with a body member 14' and a connecting web 60' extending beyond cover 12' sufficiently so that a reinforced perforation 84 in the web may receive pivot pin 76 of the centrifuge directly for attachment of the capsule thereto.

OPERATION

A sample of whole blood is placed in container 34 which may be done by use of a hypodermic needle or the provision of a suitable opening over cup 16. The holder or capsule is then connected to the centrifuge by inserting enlargement or rod 58 in tubular member 72 and placing plate 80 in closing or retaining position (FIG. 4) or a capsule having a connector of the type shown in FIG. 7 may be employed instead. Turntable 62 is then rotated for a sufficient length of time at appropriate speeds to separate the blood cells 86 from the serum 88 substantially as shown in FIG. 8. After centrifugation, a hematocrit reading is taken, for which purpose container 34 and cover 12 may be of sufficient transparency to make such a reading.

Figure 10:
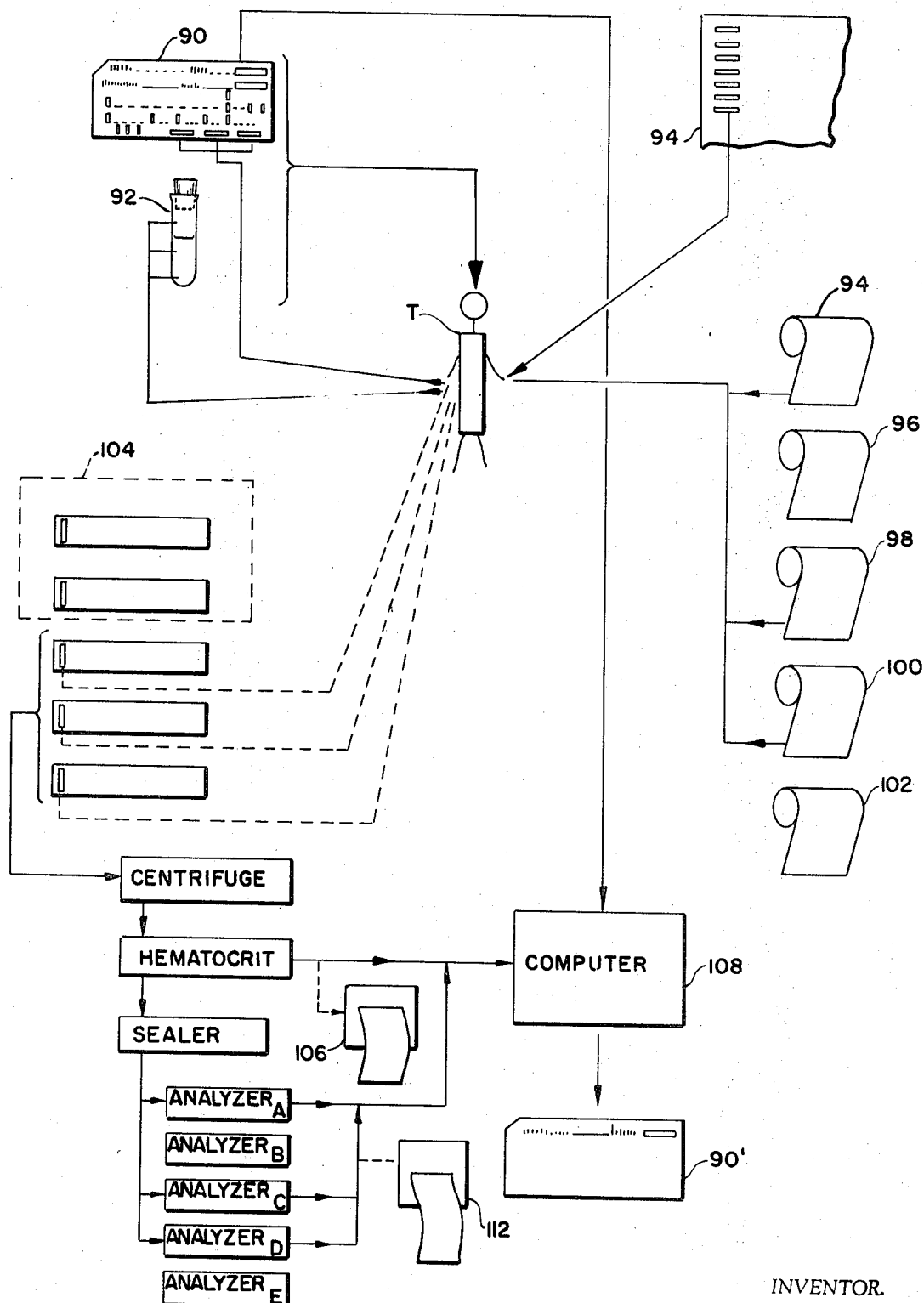
FIG. 10 is a diagram illustrating the identification means and procedure for correlating the analytical results of the sample with the patient from whom it was taken.

The identification means and procedure for correlating analytical results with the patient from whom the blood sample was taken will now be described in connection with the overall operation of the sample holder or capsule. Alternatively, capsules with or without encapsulated reagent may be used. Referring to FIG. 10, assume that a clinical laboratory is set up to perform automatically twenty different analytical tests and that these tests are set up as groups on five different analyzers. A physician has the option of selecting any or all of the five groups of tests (this is normal procedure even using manual methods). Let the five groups be designated A, B, C, D and E. A key punch type card 90 is provided (similar to that shown in the aforementioned application) and the appropriate boxes are marked for the tests desired, a blood sample is drawn into a test tube 92 and both the tube and card are sent to the laboratory. When the tube and card reach the laboratory, a technician reads the card to determine which of the tests have been selected. Assume that groups A, C and D have been selected. At this point, there are available to the technician rolls of labels 94, 96, 98, 100 and 102, each roll a different color and having a different letter prefix before a serial number which is automatically readable. Thus, identical serial numbers would appear in groups of three on each roll. For example, roll 94 could be red and have the letter A before a serial number, roll 96 blue with letter prefix B before the number, roll 98 green with letter prefix C, roll 100 yellow, etc. A supply 104 of sample holders or capsules is also available. The technician places a blood sample into container 34 of each of three capsules and attaches a red A label to one capsule, a green C label to another and a yellow D label to the third. He would also attach similar labels to the tube 92 and the key punch card 90. Thus, there would be three sample holders with blood in each of them and each with a different colored label, and probably with different serial numbers. There would also be a key punch card with patient's data as well as three labels, red A, green C and yellow D, and a test tube with identical labels on it. The test tube 92 is then stored temporarily in case a re-run is necessary or other tests are deemed required, the card 90 being either sent to be key punched and fed to a computer memory or filed for later entry of analytical results manually. The three sample holders are attached to the centrifuge as hereinbefore described and spun down. After centrifugation, hematocrit readings are taken, the serial number and reading of each sample holder are printed out on a tape, as at 106, or the information is fed to a buffer memory of a computer 108, or both. Afterward, the container 34 is sealed, as at 110 in FIG. 9, by any suitable means so as to isolate the cells 86 and sweep the serum 88 up into cup 16. Once the serum is in cup 16, the entire sample holder is tilted to have the serum wash up to the point where the capillary chamber 36 is attached to cup 16 and capillary action then draws the serum into the capillary chamber, restrictors 38 at the ends of the capillary chamber insuring that the serum is contained only in the chamber and not transferred to cup 18. The sample holder is then leveled and air pressure or other suitable means are applied to the cup 16 through a probe or a suitable top opening. This opens the restrictors 38 and forces the serum entrapped in the capillary chamber 36 into cup 18 after which the sample holders are ready to be placed into the load rack of their respective analyzers; the holder with red A label to analyzer A, C to C, etc. Each analyzer then automatically performs the proper analysis using reagents and filtering as necessary, determines the result, reads the serial number and prints the result and serial number, as at 112, or sends the information to the computer 108, or both, from which the key punch card may be properly punched to provide a completed card 90', or the data entered manually.

There has thus been disclosed a novel sample holder or capsule which is adapted to receive and spin down a blood sample and in which an amount of serum may be measured out and processed, adding reagents and filtering in situ, if desired. Although only one embodiment of the present invention has been described, it will be appreciated that obviously many modifications and variations of the invention are possible in light of the above teachings. It is, therefore, to be understood that this invention is not limited to the specific embodiment illustrated and described but is defined only by the scope of the appended claims.

What is claimed is:

1. A sample holding means comprising, in combination:
   a body member formed with a container having an elongated extension at one end of said member;
   means at the other end of said member for attachment to rotatable means for centrifugation; and
   said body member being formed with a plurality of cups in a row between said container and said attaching means.

2. The sample holding means as defined in claim 1 wherein:
   said body member is formed with a capillary chamber between said container cup and the first of said plurality of cups and in communication therewith.

3. The sample holding means as defined in claim 2 wherein:

said body member has a reagent container adjacent said first cup.

4. The sample holding means as defined in claim 3 wherein:

said body member has a filter means between said first cup and a second cup for filtering reacted fluid passing from said first cup to said second cup.

5. The sample holding means as defined in claim 1 wherein:

said body member is adapted to receive identifying indicia which is automatically readable.

6. A sample holding means comprising, in combination:

an elongated body member having a plurality of containers formed therein and disposed in a row longitudinally thereof, the container adjacent to one end of said member having an elongated extension in communication therewith, said extension extending from said container toward said one end of said member; and attaching means adjacent to the other end of said body member for connection to a centrifuge.

7. The sample holding means as defined in claim 6 wherein:

said body member is formed with a connecting conduit between a pair of said containers which is adapted to transfer a measured amount of sample from one container to the other of said pair.

8. The sample holding means as defined in claim 6 wherein:

said body member has measured amounts of reagents adjacent certain of said containers and filter means between selected ones of said last-named containers.

References Cited

UNITED STATES PATENTS

| | | | |
|---|---|---|---|
| 3,081,029 | 3/1963 | Gauslaa | 23—259 X |
| 3,115,460 | 12/1963 | McCormick | 23—259 X |
| 3,151,073 | 9/1964 | Anthon | 23—259 X |
| 3,266,298 | 8/1966 | Whitehead et al. | 23—253 X |
| 3,415,627 | 12/1968 | Rait | 23—253 |

MORRIS O. WOLK, Primary Examiner

R. E. SERWIN, Assistant Examiner

U.S. Cl. X.R.

23—292; 233—1